United States Patent [19]

Crotti

[11] Patent Number: 4,640,559
[45] Date of Patent: Feb. 3, 1987

[54] BEARING SEAL FOR ENDLESS TRACK ROLLERS

[75] Inventor: Aldo Crotti, Castelnuovo Rangone, Italy

[73] Assignee: Italtractor Meccanica ITM S.p.A., Potenza, Italy

[21] Appl. No.: 677,305

[22] Filed: Dec. 3, 1984

[51] Int. Cl.⁴ .............................................. B62D 55/14
[52] U.S. Cl. ........................................ 305/11; 305/28; 384/585; 277/92
[58] Field of Search .................. 384/481, 585; 277/92; 305/11, 28, 56

[56] References Cited

U.S. PATENT DOCUMENTS

| | | | |
|---|---|---|---|
| 2,373,443 | 4/1945 | Armington | 277/92 |
| 2,952,495 | 9/1960 | Herr, Jr. | 305/28 UX |
| 3,073,657 | 1/1963 | Oxford | 277/92 UX |
| 3,645,591 | 2/1972 | Winberg | 384/481 |
| 3,752,243 | 8/1973 | Hummer et al. | 277/92 X |

*Primary Examiner*—David A. Scherbel
*Attorney, Agent, or Firm*—Browdy and Neimark

[57] ABSTRACT

In an improved roller, a sealing arrangement (9) at either end comprises a metal annular element (11) which is able to shift axially, and which incorporates a smooth, slender frontal rim (14) breasted with the outward-facing frontal surface of the outer race (5) of an adjacent bearing (4). A thrust washer (15) is lodged between a thrust-bracket (7) and metal annular element (11). The surfaces actually breasted in relative rotation are those of the smooth rim (14) and the bearing outer race (5). The disclosed roller seeks to improve on existing types by simplifying and cutting the cost of manufacture, at the same time enhancing performance.

3 Claims, 4 Drawing Figures

BEARING SEAL FOR ENDLESS TRACK ROLLERS

BACKGROUND OF THE INVENTION

The invention relates to a track roller, in particular a bottom roller, for crawler vehicles; its field of application, however, also embraces top roller and tensioning roller functions.

The prior art teaches bottom rollers for the tracks of crawler tractors and similar vehicles, which comprise a shaft, fixed immovably to the main body of the vehicle and carrying the actual roller component, the latter rotating idle about the fixed shaft.

The roller itself is fashioned from suitably heat-treated steel, and is provided with appropriate cylindrical contact surfaces by way of which it is able to roll against the track links. Rims are also provided by means of which to keep the track correcly aligned when rolling.

The roller is hollow, and when paired with the shaft creates a chamber designed to contain a permanent supply of lubricant.

Rolling bearings enable the roller to rotate about its fixed shaft, and may be either of the ball or of the roller type. Such bearings absorb both radial load and axial thrust produced once the track is in motion, and are seated in special recesses at either end of the roller, the outer race of each bearing being pressed into a relative recess, thus turning as one with the roller. Means are provided, in the shape of a shoulder located at the inside of each recess, by which to prevent either bearing from shifting in an axial direction toward the center of the roller.

Thrust-brackets pressed onto the shaft, and therefore integral with the latter, abut with the inner race of the bearing at each respective end of the roller, and serve to prevent end float of either of the two bearings.

Thus, the bearings roll in a fixed axial position, lodged between the shoulders of the roller on the one hand, and the shaft thrust-brackets on the other; the roller in its turn remaining fast between its bearings and unable to move in an axial direction.

Seeing that the bearings are in direct contact with the lubricant chamber, means must be provided by which to prevent egress of the lubricant, and these take the form of conventional O-rings located between the shaft and the fixed thrust-bracket inner surfaces. Fluid is therefore prevented from seeping out along the shaft. Further seals are provided between the track-roller's bearing recesses and their respective adjacent thrust-brackets, which perform the dual function of preventing egress of lubricant by way of the bearings, and of excluding dust and dirt which would be damaging to the latter.

In track-rollers according to the prior art, these last-mentioned seals each take the form, substantially, of a pair of opposed annular metallic elements. Such opposed elements make direct contact one with the other, the first such element integral with the thrust-bracket, hence with the shaft, and the second integral with the track-roller. At least one thrust washer is located between the thrust-bracket and the first annular element, and will be fashioned from, for instance, an elastomer material. The annular elements thus arranged are permitted a slight degree of axial movement, and the fixed thrust-bracket urges them one against the other continually.

The actual contact surfaces which provide the seal are incorporated into the annular elements themselves, and take the form of accurately machined radial edges breasted together in relative rotation.

The thrust-brackets also incorporate a tubular body extending as far as the relative free end of the fixed shaft and offering the appropriate fitting by way of which the bracket itself may be mounted to the body of the vehicle; for it will be appreciated, as the shaft of the track-roller is immovably fixed to these brackets, the brackets themselves afford the means by which the shaft may be secured to the body of the vehicle.

The invention described herein sets out to improve track-rollers of the type thus briefly outlined, and in particular, seeks to simplify and reduce the cost of manufacture, whilst up-grading performance.

SUMMARY OF THE INVENTION

In the improved track-roller disclosed herein, the bearing seals each comprise one rigid annular element only, this being fashioned from metal, able to move in an axial direction, and provided with a smooth, slender frontal rim directed toward the track-roller and breasted with the outward-facing frontal surface of the outer race of a respective bearing; also, a thrust washer compressed between the respective thrust-bracket and metal annular element; the breasted surfaces of the rotary seal thus embodied being provided by the frontal rim of the rigid annular element and the outward-facing frontal surface of the bearing outer race.

By adopting this design concept, one achieves first and foremost a considerable reduction in the axial dimension of the seal; the bearings can thus be spread farther apart, making for a better distribution of the mechanical load on bearings and track-roller alike.

A further advantage offered by the track-roller as described herein is that of reduced costs, since the rotary seal has less parts, and therefore involves less manufacturing expense.

Another advantage of the invention is that special recesses are no longer required in the body of the track-roller. In prior art rollers, such recesses accommodate that part of the seal assembly which turns with the roller, and therefore require accurate and costly machining processes.

What is more, the track-roller according to the invention is provided with means for mounting the fixed shaft to the main body of the vehicle, which remain separate from the thrust-brackets and consist of U-type fittings that cradle the ends of the shaft and incorporate lugs with bolt-holes for fixing purposes. More exactly, the single U-type fitting consists of a strip of durable metal, steel for instance, presenting a substantially uniform thickness, exhibiting an arched center portion designed to encompass the roller shaft at least in part, and having two flat end-sections lying within a common plane, these provided with bolt-holes through which threaded fasteners are inserted when mounting the assembly to the body of the vehicle.

The track-roller claimed herein thus permits of a simplification and attendant reduction in costs when manufacturing thrust-brackets and fittings, when compared with the prior art. the U-type fittings can be drawn from raw stock, and their bolt-holes punched. The thrust-brackets can be turned from tube, or pressure die-cast, in which case a simple machining operation will suffice to produce the correct internal diameter, or alternatively, extruded from slugs. By contrast, the same part in a conventional track-roller assembly must first be cast or molded, and then turned on a lathe, or machined or drilled, and is thus considerably more expensive to produce.

Yet another advantage of the improved track-roller described herein, is its adjustable mounting system. The location of the U-type fittings along the axis of the shaft, hence their distance from the actual roller part of the assembly, can be varied in such a way as to adapt the entire assembly to distances between mounting points which may vary from vehicle to vehicle.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
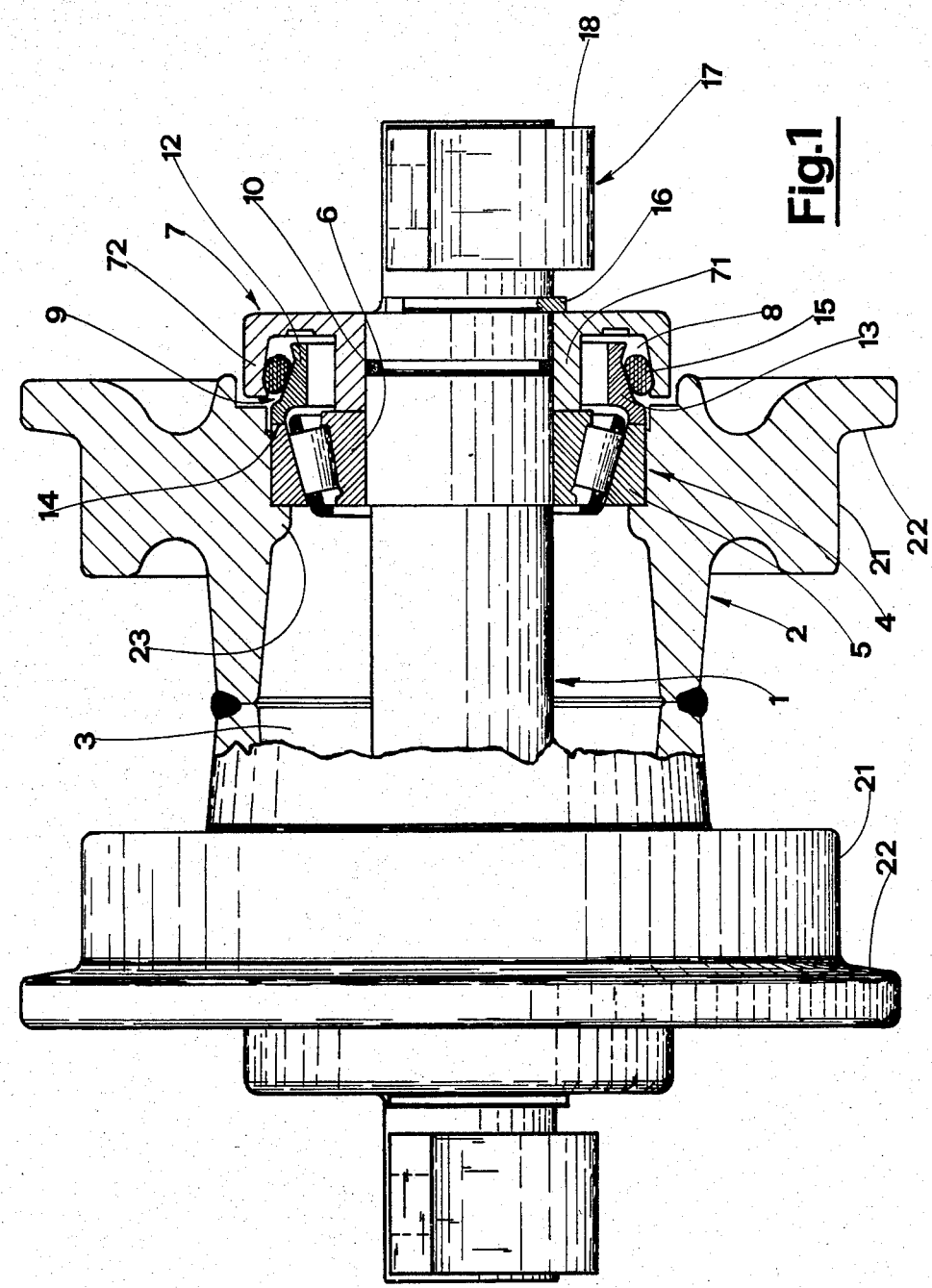
FIG. 1 is a side view of the improved track-roller as described herein, seen in cutaway.

With reference to the drawings, 1 denotes the fixed shaft about which the body 2 of the roller is caused to rotate. The roller-body itself is fashioned from pressed steel and made up of two identical and symmetrically-disposed halves, these matched together and welded through the transverse plane about which the two halves lie thus symmetrically-disposed, before receiving an appropriate heat-treatment for the type of application in question.

The ends of the roller incorporate respective cylindrical contact surfaces 21 on which the track-links roll when in motion, and these same surfaces are flanked outwardly by rims 22 which keep the track correctly aligned.

The body of the roller is hollow from end to end, and its central section forms an annular chamber 3 which encircles the shaft 1 and contains a permanent supply of suitable lubricant.

Two rolling bearings 4 located between roller-body 2 and shaft 1 absorb axial thrust and radial loads to which the assembly is subject. In the preferred embodiment illustrated in FIG. 1, these bearings are of the taper roller type, and are lodged in appropriate recesses located at either end of the roller-body 2 in such a way as to create the end-walls of said annular chamber 3.

The outer race 5 of each bearing is prssed into its respective recess and thus turns as one with the track-roller body 2. A shoulder 23 located at the inside of each bearing recess prevents any possibility of the outer race 5 shifting axially toward the center of the assembly.

The inner race 6 of each bearing fits exactly over the shaft 1, and is prevented from shifting away from the assembly axially by the presence of one of a pair of relative thrust brackets 7 which provide a cover for the bearing recesses, and abut with the outward-facing frontal surface of said inner race 6 at each end of the assembly.

Thus, the bearings 4 are unable to move axially in either direction, being lodged between the two shoulders 23 on the one hand, and the pair of thrust-brackets 7 on the other.

The single thrust-bracket 7 comprises a central tubular section 71 pressed onto the fixed shaft 1 which provides the thrust element by virtue of its abutting with the inner race of the bearing, and a peripheral section 72 exhibiting an L-shaped profile which both provides the cover for the bearing 4 and its recess and serves to create an annular space 8. A partial enclosure is thus created, whose open front is offered to the bearing 4.

The thrust-bracket thus embodied is relatively inexpensive to produce thanks to the very simplicity of its shape.

The two bearings 4 communicate directly with the lubricant chamber 3, and therefore turn in an oil bath. To avoid loss of the lubricant through leakage along the surface of the shaft 1, it may suffice simply to press the thrust-brackets 7 onto the latter; alternatively, an O-ring 10 may be located on the shaft 1 (in which case the shaft will incorporate an appropriate groove) and compressed radially by the tubular section 71 of the thrust-bracket.

To avoid the lubricant's leaking out via the two bearings 4, and to protect the bearings themselves from dust, dirt and stones &c., sealing means 9 are provided which are housed within the annular spaces 8 aforesaid, at either end of the assembly.

The single sealing means 9 claimed herein comprises a metal annular element 11 having an inside diameter greater than the outer diameter of said tubular section 71. This annular element 11, as seen in FIG. 1, has an outer annular section 12, which encircles said tubular section 71, and a further, protruding annular section 13 offered to the end of the roller, which has a smooth, slender frontal rim 14 of diameter such as to permit of its being breasted with the outward-facing frontal surface of the outer race 5 of the bearing 4.

The single sealing means 9 further comprises a thrust-washer 15 fashioned from an elastomer, lodged between the L-profile section 72 of the bracket 7 and the outer annular section 12 of the annular element 11. Located thus, the thrust-washer 15 keeps said annular element 11 urged in toward the bearing 4 with those outer race 5 it is breasted as aforementioned.

The outer race 5 of each bearing is pressed into the body 2 of the track-roller and therefore turns with the roller as one, whilst the annular element 11, being immovably associated with the thrust-bracket 7, remains stationary. It ensures, therefore, that the surfaces breasted together in relative rotation are in fact the smooth frontal rim 14 of the annular element 11 and the outward-facing frontal surface of said outer race 5. This being so, the bearing-surface in question will be machined in such a way as to reduce rubbing-friction to a minimum, and to provide a fluid-tight seal.

The thrust-bracket 7 at each end of the assembly is locked in position on the shaft 1 by a relative circlip 16 snapped into a groove in the shaft itself. The two grooves (one at either end) are located externally of their relative brackets as viewed in FIG. 1, and are spread such that the brackets abut closely with said relative circlips 16 at either end of the assembly.

Figure 4:
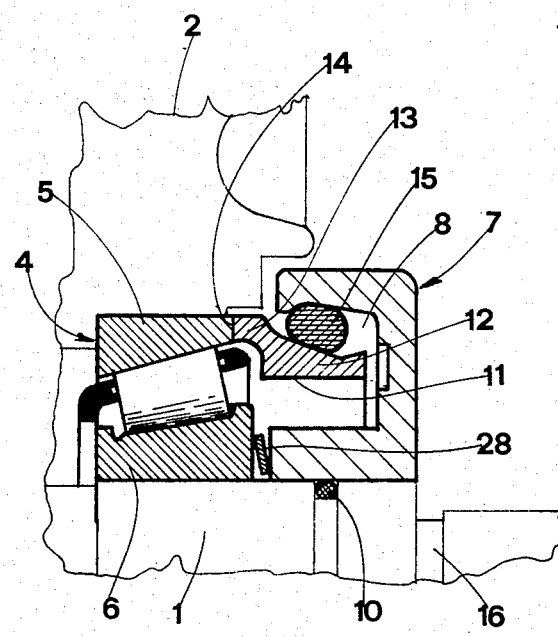
FIG. 4 shows a detail of the assembly in FIG. 1, differently embodied.

A further embodiment of the invention shown in FIG. 4 exhibits a thrust-bracket 7 spaced apart from the inner race 6 of the bearing, instead of abutting therewith. In this instance, a third, and flexible annular element 28, e.g., a belleville disc, is located in the space created in order to take up any end float to which the roller may be subject.

Means for fixing the shaft 1 to the main body of the crawler vehicle are embodied separately from the thrust-brackets 7, unlike means as set forth in prior art track-rollers, and comprise a pair of U-type fittings 17 which cradle the ends of the shaft and are provided with lugs through which to insert fasteners.

Figure 2:
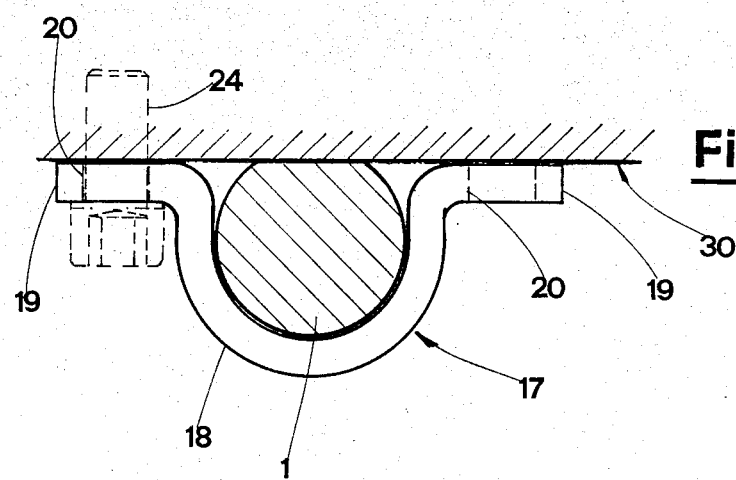
FIG. 2 is a front view of the U-type fitting.

Each U-type fitting consists of a strip of steel presenting uniform, or at least substantially uniform thickness, exhibiting an arched center portion 18 which is designed to encompass the shaft 1 at least in part, and having two flat end-sections 19 lying within a common plane, these provided with bolt-holes 20 through which threaded fasteners are inserted (for instance, heavy socket screws as in FIGS. 2 and 3) when mounting the assembly to the main body of the vehicle 30.

Figure 3:
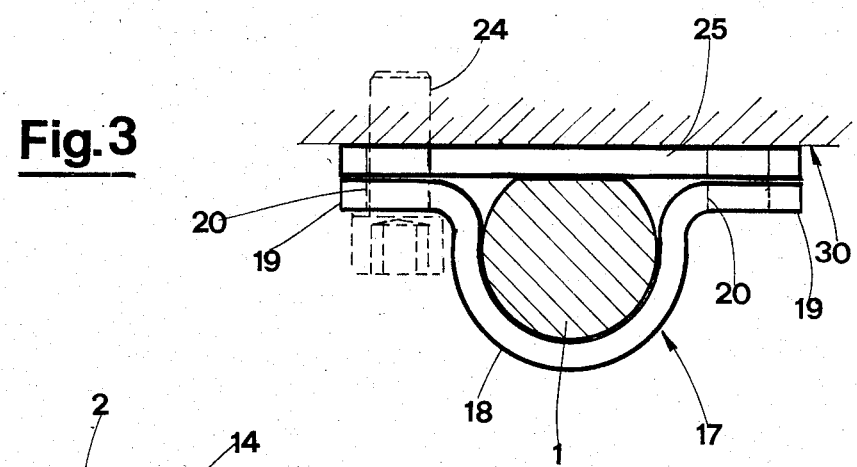
FIG. 3 shows a variation of the U-type fitting illustrated in FIG. 2.

The shaft 1 is ground flat at the point where each U-type fitting is clamped, so as to afford greater stability to the assembly as a whole when mounted to the vehicle 30. In those instances where track-roller dimensions may dictate the need for a greater degree of clearance from the vehicle 30, an additional flat strip 25 of the appropriate thickness may be inserted between the latter and the shaft-and-fittings as shown in FIG. 3.

Whether clamped direct to the vehicle 30, or via the flat strip 25, the cradled shaft 1 remains slightly proud fo the U-type fitting's flat end-sections 19 so as to ensure a solid, immovable fit once the threaded fasteners 24 are tightened. The U-type fittings 17 can thus be varied for position in an axial direction along the shaft 1, so as to adapt to different mounting requirements from vehicle to vehicle. As aforementioned, the fittings 17 are easiy manufactured by drawing and punching, though the option exists of their being cast, should strengthening-ribs be considered desirable.

Whatever the manufacturing process ultimately employed, the fittings and thrust-brackets as claimed herein are much less expensive to produce than corresponding parts as per the prior art.

Notwithstanding the U-type fitting and relative thrust-bracket disclosed are embodied separately, it remains within the scope of the invention that they might equally well be cast or forged as a one-piece component.

In addition to the advantages already described, the track-roller assembly described herein provides the further bonus of simplified assembly; the number of parts making up each rotary is reduced, and the axial dimension of the shaft's 1 and the bracket's 7 mating surfaces is likewise reduced.

What is claimed:

1. An improved roller for the tracks of crawler tractors and other similar vehicles, comprising:

a shaft fixed immovably to a crawler vehicle and including opposing end portions;

a roller body having portions adjacent each of said shaft end portions and being supported by said shaft for rotation about the longitudinal axis of said shaft, said roller body having a recess at each end of said portions;

a chamber defined between said roller body and said shaft for containing lubricant;

a pair of bearings each secured in each of said recesses, each said bearing including an inner race engaging with said shaft and an outer race engaging with said roller body;

a pair of thrust brackets, each secured on said shaft adjacent respective end portions thereof, said thrust brackets cooperating to maintain said roller body at a predetermined position on said shaft; and means, cooperating with said bearings and said thrust brackets, for preventing leakage of said lubricant from within said chamber through said bearings, each said preventing means being positioned at a portion of said roller body adjacent a respective shaft end portion and comprising annular sealing means and annular thrust means, said annular sealing means consisting solely of a metal ring supported, coaxially about said shaft at said roller body portion between said respective thrust bracket and said respective bearing, for movement in a direction axially of said shaft, said ring having a radially extensive surface engageable with a radially extensive surface of said bearing outer race, and said annular thrust means consisting solely of an elastomeric ring in direct engagement with, and compressed between, an inner surface of said thrust bracket and an outer surface of said metal ring.

2. An improved roller as in claim 1, wherein
   the thrust brackets (7) are axially fixed on the shaft (1) by means engaging with the shaft itself;
   each said thrust-bracket comprising a central tubular section (71) pressed onto the shaft (1) and abutting against a respective bearing (4), and a peripheral annular section (72) having an L-shaped profile and covering the bearing, said peripheral section defining with the outer surface of said metal ring an annular space (8), the interior of said annular space housing the elastomeric ring of said preventing means.

3. An improved roller as in claim 2, and further including flexible annular elements (2), located between the tubular section (71) of the thrust-bracket (7) and a respective bearing (4), for resiliently accomodating any end float to which the roller may be subject.

* * * * *